UNITED STATES PATENT OFFICE.

DUBOIS D. PARMELEE, OF NEW YORK, N. Y.

IMPROVEMENT IN VULCANIZING CAOUTCHOUC.

Specification forming part of Letters Patent No. 23,855, dated May 3, 1859.

*To all whom it may concern:*

Be it known that I, DUBOIS D. PARMELEE, of the city of New York, in the county and State of New York, have invented certain new and useful Improvements in the Manufacture of India-Rubber Goods; and I hereby declare that the following is a full, clear, and exact description of the same.

The nature of my improvement consists in a new method of giving to india-rubber and gutta-percha separately and when combined, and also when these matters or either of them are combined with other substances, permanent and increased elasticity, and of removing the tendency to stiffen and harden by cold and to soften and to decompose by heat by the use or employment of a solution prepared in the manner hereinafter described, into which the said rubber, gutta-percha, or their compounds are to be immersed in order to produce the effect above mentioned, and which I call the "hermizing effect;" and my improvement further consists in using sulphur in combination either with the rubber or with the said solution previous to the immersion of the rubber or its equivalent into said solution.

In order that my invention may be distinguished from all other inventions, I would remark that I aware that caoutchouc has been rendered more permanent in its character and less liable to the prejudicial effects of varying temperatures by combining sulphur therewith and subjecting the compound to high degrees of heat, by which peculiar change is produced in the character of caoutchouc, and which is well known by the name of "vulcanized rubber." I am also aware a change similar to that produced by vulcanization has been effected without the use of heat, and by the immersion of rubber or gutta-percha or their compounds into a solution of chloride of sulphur in bisulphuret of carbon or other suitable solvents of caoutchouc. The rubber thus changed requires subsequently to be heated in a drying-room to at least 80° Fahrenheit. Both of these methods present disadvantages which will so more readily appear from a comparison with my invention.

In order that my invention may be most fully understood and readily carried into effect, I will proceed to describe the means pursued by me.

I employ either of the known varieties of india-rubber or gutta-percha, or their compounds, masticated and mixed or blended with sulphur according to any convenient mode and manner usually performed in and for the vulcanizing process, and after fashioning it into a desired form I produce the hermizing effect by immersing the goods so prepared into a solution prepared in the following manner:

I prepare dry chlorine gas in any known manner by pouring, for instance, diluted sulphuric acid on a mixture of common salt and oxide of manganese, or by pouring strong muriatic acid upon finely-powdered black oxide of manganese contained in a retort or flask, and applying gentle heat. If the latter mode of preparing the dry chlorine be adopted, the neck of the retort wherein the gas is generated is brought in communication with or caused to terminate in a vessel containing bisulphuret of carbon or sulphuret of carbon or coal-naphtha or turpentine or chloroform or any suitable solvent of caoutchouc. The dry chlorine gas is allowed to pass into either of the above-named ingredients until a solution is obtained, which is saturated in greater or lesser degree with the said chlorine gas, according to the intensity that is desired to be produced in the hermizing effect, and which varies with the nature of the goods operated on, and their respective purposes.

In the solution thus prepared I immerse the caoutchouc in sheets or other forms, allowing them to remain therein according to the thickness of the substance of the article. To illustrate, I find that "nipples" made of india-rubber of about one-sixteenth of an inch in thickness require an immersion of but thirty seconds to produce the change or hermizing effect in the material.

In case the caoutchouc is of considerable thickness, the solution should be made weaker, that it may act more slowly upon the mass, as a strong solution, when in contact for a long period, would harden the substance.

This my improvement is also applicable to the treatment of caoutchouc or gutta-percha or their compounds when not combined or blended with sulphur.

I operate on articles so fashioned into the desired form by immersing the same in a solution composed of either coal-naphtha, bisulphuret of carbon, or chloroform, sulphur, and dry chlorine gas.

The following I recommend as proportions of these ingredients and mode of preparing the solutions. I take ten pounds of bisulphuret of carbon, or of coal-naphtha, or of chloroform, as convenience may direct. In either of these I dissolve one pound of sulphur. Then into this solution I pass dry chlorine gas in such volume as will cause the solution to assume a fine yellowish-green color. If the operator desires a surer test than that of color, he may dip small slips of caoutchouc into the solution as it is being charged with dry chlorine gas, and when the desired effect is obtained the further saturation of the solution with the chlorine gas is arrested.

The advantages of my process over the ordinary vulcanizing and converting processes are numerous, and consist particularly in the higher finish and beauty of the articles produced, in the saving of time and cost in the manufacture, in lessening the dangers in the manufacture, and in diminishing the liability to the goods being destroyed by carelessness on the part of the operators.

Having thus fully described my invention and the manner in which the same is to be performed, I wish to be understood as not claiming the preparation of caoutchouc, gutta-percha, or their compounds by blending or incorporating therewith sulphur in any form or manner; but

What I claim is—

1. The method herein described of treating caoutchouc, gutta-percha, and their compounds for the purposes set forth by employing agents in an aeriform or gaseous state combined with a solvent in the liquid state.

2. In combination with a solution prepared in the manner herein specified to operate on caoutchouc, gutta-percha, or their compounds, as set forth, preparing the said caoutchouc, gutta-percha, or their compounds by blending or incorporating therewith sulphur, substantially as described.

3. Dissolving sulphur, in the proportions set forth or thereabout, in the solution prepared as specified herein, when the same is used in combination with rubber, gutta-percha, or their compounds previously free from sulphur.

In testimony whereof I have signed my name to this specification before two subscribing witnesses.

DUBOIS D. PARMELEE.

Witnesses:
A. POLLOK,
EDM. F. BROWN.